United States Patent [19]
Gates, Jr. et al.

[11] 3,923,893
[45] Dec. 2, 1975

[54] PRODUCTION OF SECONDARY ALKYL PRIMARY AMINES

[75] Inventors: Walter C. Gates, Jr., Newburgh; Robert M. Suggitt, Wappingers Falls; Ralph B. Hudson, Jr., Beacon, all of N.Y.

[73] Assignee: Texaco Inc., New York, N.Y.

[22] Filed: Dec. 26, 1973

[21] Appl. No.: 428,639

[52] U.S. Cl. .................... 260/583 M; 260/644; 260/688
[51] Int. Cl.² ............... C07C 85/11; C07C 85/00; C07C 87/04
[58] Field of Search........ 260/688; 260/583 M, 688, 260/644

[56] References Cited
UNITED STATES PATENTS

| | | | |
|---|---|---|---|
| 3,151,162 | 9/1964 | Pevere et al. | 260/583 M |
| 3,470,252 | 9/1969 | Doyle et al. | 260/583 M |
| 3,737,460 | 6/1973 | Suggitt | 260/583 M |
| 3,801,640 | 4/1974 | Knifron | 260/583 M |

*Primary Examiner*—Joseph P. Brust
*Attorney, Agent, or Firm*—T. H. Whaley; C. G. Ries; George J. Darsa

[57] ABSTRACT

A process for producing secondary alkyl primary amines from n-paraffins where a portion of the paraffin is nitrated to nitroparaffin along with the formation of nitrated and oxygenated by-products, where the nitroparaffin is essentially completely hydrogenated to the amine, and where the amine is separated from a mixture composed of unreacted paraffin and by products, which comprises catalytically hydrogenating the mixture composed of paraffin and by-products in the presence of a catalyst composed of alumina and a Group VIII metal at a temperature of from about 600° to 750°F. and recycling the hydrogenated product for nitration with the n-paraffin.

10 Claims, No Drawings mately 5 weight percent SiO$_2$, thoria-alumina, zirconia-alumina, titania-alumina and chromia-alumina. The Group VIII metal is present in amounts ranging from about 0.1 to 5.0 weight percent, preferably 0.1 to 2.0 weight percent for the noble metals and from 1 to 5 percent for nickel and/or cobalt based on the composite catalyst. The Group VIB metal oxide component when present ranges from about 5 to 20 weight percent of the composite catalyst. The Group VIIB metal can be present in an amount of from about 0.1 to 2.0 weight percent.

The catalyst employed herein and described above can be prepared by introducing the Group VIII metal, and when desired the Group VIB or VIIB member, to the alumina by impregnating with an aqueous solution of a soluble salt of the metal followed by drying and calcination at a temperature of from 600° to 1200°F. for several hours.

The alumina component of the catalyst complements the hydrogenating activity of the Group VIII metal moderated by the presence of the nitrogen containing by-products by promoting the dehydration of the oxygenated by-products, such as alcohols or ketones, to the corresponding olefins which are in turn hydrogenated to n-paraffin. This property of the catalyst is particularly beneficial not only at the operative hydrogenation temperature range of from 600° to 750°F., but the dual functional aspect of the catalyst is particularly advantageous in converting any olefinic material formed at the elevated temperatures and partially converted to n-paraffin to be essentially completely converted to n-paraffin by an additional and subsequent hydrogenation undertaken at 450° to 650°F.

The catalyst described above to be selective in converting the mixture of n-paraffin and by-products to substantially pure n-paraffin at a temperature of from about 600° to 750°F. requires the presence of at least a portion of the nitrogen containing by-products of the preceding nitration and hydrogenation, some of which may have been separated along with the amine and which can be reintroduced to the mixture and present during hydrogenation of the material intended for recycle. The presence of the nitrogen containing by-products moderates the activity of the Group VIII metal on alumina catalysts which in the absence thereof and at the hydrogenation temperatures of from about 600° to 750°F. otherwise causes substantial isomerization and hydrocracking of the mixture to isoparaffins and light paraffins. The presence of the nitrogen containing by-products in an amount of from about 10 to 5000 parts per million, preferably 100 to 3000, basis the paraffin mixture deters isomerization and hydrocracking of the mixture including the n-paraffin and by-products and thereby selectively converts the by-products including the nitrogen containing moderating agents to valuable n-paraffin recycle feedstock.

The mixture of unreacted n-paraffin and by-products hydrogenated and recycled in accordance with the instant invention, is derived from a paraffin hydrocarbon or paraffin hydrocarbon mixtures containing from 6 to 30 carbon atoms, initially nitrated and subsequently hydrogenated to the corresponding amine. Typical paraffin hydrocarbons include n-hexane, n-heptane, n-octane, n-decane, n-dodecane, n-octadecane, n-eicosane, n-pentacosane, n-triacontane and mixtures thereof. Representative paraffins and mixtures of paraffins include hydrocarbons containing from 6 to 30 carbon atoms which may be obtained, for example, by absorption in molecular sieves or from such other processes as urea or solvent dewaxing and are also contemplated as starting materials.

NITRATION

The nitration of the paraffin hydrocarbons to secondary mono-nitroparaffins is conducted in a liquid-vapor process. The paraffin hydrocarbon along with the upgraded recycle hydrogenated stream provided herein is contacted with a nitrating agent, such as nitrogen dioxide, dinitrogen tetroxide or nitric acid, at a temperature of from about 250° to 500°F. at pressures ranging from atmospheric to 20 atmospheres thereby converting from about 5 to about 50 percent of the paraffin hydrocarbon principally to the corresponding secondary mono-nitroparaffin. By secondary mono-nitroparaffin we mean that the nitro group is predominantly located on other than the paraffin's terminal carbon atom.

Illustrative mono-nitroparaffins include 2 or 3-nitrohexane, 2, 3 or 4-nitroheptane, 2, 3 or 4-nitrooctane, 2, 3, 4 or 5-nitrodecane, 2, 3, 4, 5 or 6-nitroundecane, 2, 3, 4, 5 or 6-nitrododecane, 2, 3, 4, 5, 6 or 7-nitrotridecane, 2, 3, 4, 5, 6 or 7-nitrotetradecane, 2, 3, 4, 5, 6, 7, 8 or 9-nitrooctadecane and mixtures thereof. The amount of nitrating agent employed can vary within wide limits, as for example, from about 0.05 to 0.55, preferably 0.1 to 0.3, moles of nitrating agent per mole of paraffin. Any excess nitrating agent can be recovered along with, for example, nitric oxide, a gaseous reaction by-product, the latter in continuous operations subsequently oxidized to nitrogen dioxide and the nitrating agent stream recycled for reintroduction into the nitration reaction zone.

In the course of nitration, reaction by-products are formed including C$_6$ to C$_{30}$ ketones, alcohols, carboxylic acids, nitrites, nitrates and multifunctional by-products, such as dinitroparaffins, nitroalcohols, nitroketones, nitroolefins, nitroacids and trinitroparaffins. These by-products are carried along in the liquid crude nitration product after separation of such off-gases as nitrogen, nitrous oxide, carbon dioxide, carbon monoxide, nitric oxide, water and unreacted nitrating agent. The crude nitrated liquid product typically comprises from 5 to 35 weight percent nitroparaffin and from 0.5 to 15 weight percent by-products.

HYDROGENATION TO AMINE

The secondary mono-nitroparaffins described above contained in the crude liquid nitrated product are essentially completely hydrogenated to secondary alkyl primary amines and some secondary alkyl secondary amines at conversion temperatures ranging from over 350° to 500°F. in the presence of conventional and well-known hydrogenation catalysts. A preferred catalyst is palladium on carbon. Preferably the crude liquid product is caustic washed in an aqueous medium prior to the hydrogenation where some of the by-products deleterious to hydrogenation catalyst life are removed.

The crude liquid hydrogenated product comprises C$_6$ to C$_{30}$ n-paraffin, secondary alkyl primary amine and lesser amounts of secondary alkyl secondary amine, alcohols, ketones, water and polyfunctionals such as aminoketones, aminoalcohols, diamines and triamines. Conventional recovery procedures may be employed for recovering the desired primary amine as by distill-

PRODUCTION OF SECONDARY ALKYL PRIMARY AMINES

This invention relates to the production of amines and more specifically to the production of secondary alkyl primary amines having from 6 to 30 carbon atoms from paraffin hydrocarbons. In particular, this invention relates to a continuous process for the production of high purity secondary alkyl primary amines from paraffin hydrocarbons.

Processes for the production of secondary alkyl primary amines from paraffin hydrocarbons have been previously described in, for example, U.S. Pat. No. 3,470,252. In general, the amines have been prepared by nitrating from 5 to 50 weight percent of the paraffin to nitro-paraffin employing, for example, nitric acid, nitrogen dioxide or dinitrogen tetroxide and thereafter reducing the nitroparaffin with hydrogen in the presence of a hydrogenation catalyst. The product resulting from the nitration and hydrogenation reaction provides not only the desired amine but additionally contains unreacted paraffin, nitroparaffin and by-products of each of the previous reactions. Amines of high purity are recovered from the hydrogenated nitroparaffin product employing various separation techniques, as for example, the methods developed and disclosed in U.S. Pat. No. 3,470,251.

The formation and buildup of substantial amounts of by-products seriously reduces the attractiveness and selectivity of the process, particularly in continuous processing where unconverted paraffin and by-products are contemplated for recycle to the initial nitration stage. The process would be substantially improved by providing recycle feedstock possessing a reduced by-product content.

The principal source of by-products is derived from the initial nitration involving reaction between the nitrating agent, such as nitrogen dioxide, dinitrogen tetroxide and nitric acid, and the paraffin. In addition to the principal nitroparaffin product, there is produced through a series of complex mechanisms a plurality of other materials including nitrites, nitrates, olefins, ketones, alcohols, acids and polyfunctionals, such as nitroalcohols, dinitroparaffins, nitroketones and nitroolefins. While caustic washing of the nitrated product as disclosed in the art removes some of the by-product, primarily the acids, a substantial amount of by-product is passed on to the amine forming hydrogenation step. Following hydrogenation of the nitroparaffin to the amine, the by-products can, in effect, constitute up to 35 weight per cent of the liquid hydrogenation product excluding unreacted paraffin. It will be appreciated that the propensity of the reaction to form by-products seriously reduces the selectivity of the process insofar as production of nitroparaffin and ultimately secondary alkyl primary amines are concerned. Moreover, in continuous processing where recycle of the predominantly unreacted paraffin streams containing unconverted nitroparaffin and by-products to the initial nitration stage is contemplated, there will occur in the course of long periods of operation a substantial buildup of contaminating by-products interfering with the orderly conversion at high selectivity of the paraffin to the amine, which ultimately leads to a highly unsatisfactory and cost-prohibitive operation.

Heretofore, hydrogenation of the mixture of paraffin, nitro-paraffin and by-products was taught to be undertaken at temperatures of from about 450° to 600°F. using hydrogen pressures of from 200 to 4,000 p.s.i.g. in the presence of certain known and conventional hydrogenation catalysts. Temperatures below 450°F. were described as not giving appreciable hydrogenation and temperatures in excess of 600°F. were to be avoided as the same caused undesirable isomerization, cracking and coking of the hydrocarbons. However, hydrogenation of the mixture over the disclosed catalysts is not particularly effective at 450° to 600°F. inasmuch as some hydrocracking and isomerization occurs which reduces the amount of valuable feed-stock which can be recycled. Further the oxygenated by-products in the mixture are only partially hydrogenated and converted to n-paraffin such that a considerable amount of incompletely converted by-products are recycled to the nitration reaction.

It is therefore an object of this invention to provide a process for selectively converting paraffin hydrocarbons to secondary alkyl primary amines.

Another object of this invention is to provide a process for the production of secondary alkyl primary amines from n-paraffins wherein the by-product content of recycle stream is substantially reduced.

Yet another object of this invention is to provide a process wherein secondary alkyl primary amines are prepared from n-paraffins by means of a continuous process wherein the by-product content in the recycle stream is substantially reduced and where the amines are recovered in high purity.

Other objects and advantages will become apparent from a reading of the following detailed description and examples.

SUMMARY OF THE INVENTION

Broadly this invention contemplates a process for producing secondary alkyl primary amines from n-paraffins wherein a portion of the n-paraffin is nitrated to form a nitroparaffin along with nitrated and oxygenated by-products, wherein the nitroparaffin is essentially completely hydrogenated to the amine and where the amine is separated from a mixture of unreacted paraffin and by-products, the improvement which comprises:

a. catalytically hydrogenating the mixture at a temperature of from about 600° to 750°F., preferably from about 650° to 710°F. in the presence of a catalyst composed of alumina and a Group VIII metal; and b. recycling the hydrogenated product of (a) for nitration with the n-paraffin.

The catalyst employed in our process comprises a member of Group VIII of the Periodic Table and alumina. Exemplary of the Group VIII metals are platinum, palladium, rhodium and ruthenium. Nickel and cobalt are also contemplated preferably in combination with a Group VIB metal oxide such as molybdenum oxide or tungsten oxide. A Group VIIB member such as rhenium present as the metal can also be used in combination with the Group VIII metal. Aluminas in various forms may be used as a component of the catalyst and particularly those aluminas having replaceable surface hydroxyl groups and surface areas of from 50 to 400 square meters per gram using the BET method. Included within our definition of alumina we mention, for example, eta-alumina, gamma-alumina, silica stabilized aluminas, i.e. aluminas containing up to approxiing the hydrogenated product by stepwise fractionation. Alternatively, the amine may be converted and recovered as an amine salt by reaction of the crude liquid product with an inorganic acid followed by further treatment of the amine salt with alkali and thereafter recovering the primary amine by distillation. In a highly preferred procedure the amine containing liquid hydrogenation product is treated with carbon dioxide at about 15° to 100°C. under pressures ranging from 100 to 500 p.s.i.g. where the hydrogenated product is admixed with from about 1 to 10 moles of carbon dioxide per mole of amine present in the hydrogenation product until substantial quantities of an amine-carbon dioxide complex are formed in mixture with paraffins and by-products. This mixture is thereafter contacted with from about 1 to 5 parts by weight of alkanol-water solvent mixture substantially saturated with carbon dioxide. Contacting the paraffin and the complex with the solvent mixture, for example, methanol-water, causes a solvent phase to form containing substantially all of the by-products including the secondary amine. It will be appreciated that the separation technique employing carbon dioxide is selective in removing primary amine and rejecting secondary amine. Separation employing a strong inorganic acid extracts both primary and secondary amines which can be subsequently separated by distillation after neutralization. The solvent phase is thereafter heated to about 60° to 150°C., or alternatively the pressure of the solvent phase is reduced, thereby springing the amine and flashing off carbon dioxide and a portion of the solvent. The amine is recovered from residual solvent by distillation of a combination of distillation and decantation and the purity of the amine recovered is in excess of 98 weight per cent.

RECYCLE HYDROGENATION

The by-products of the nitration and hydrogenation reactions in admixture with the paraffin separated above are upgraded and made suitable for recycle and introduction to the initial nitration reaction by means of a hydrogenation treatment. Typically the recycle mixture contemplated for hydrogenation in accordance with the instant invention is predominantly $C_6$ to $C_{30}$ n-paraffin containing from about 0.5 to 15 weight percent by-products and is essentially completely free of nitroparaffin, nitrates, nitrites and polyfunctional nitrocompounds. Representative of the by-products are $C_6$ and $C_{30}$ oxygenated and aminated materials illustrated by alcohols, ketones, diamines, triamines, aminoketones, aminoalcohols, unextracted secondary alkyl primary amine product and $C_{12}$ to $C_{60}$ secondary alkyl secondary amines.

The nitrogen containing by-products, that is the aminated $C_6$ to $C_{30}$ ketones, alcohols, diamines and triamines along with the $C_{12}$ to $C_{60}$ secondary amines present in an amount of from about 10 to 5000 parts per million basis the paraffin mixture, and the absence of nitro and polynitro compounds such as nitroparaffins, nitroalcohols, nitroketones, dinitroparaffins, nitrates and nitrites, act as moderators in the instant process such that their presence in the recycle mixture intended for hydrogenation and in the presence of the designated catalyst deters isomerization and hydrocracking of the n-paraffin and by-products at 600° to 750°F. and assists in selectively converting the recycle including the moderator to essentially $C_6$ to $C_{30}$ n-paraffin.

It has now been found that the above mixture of n-paraffin and by-products is essentially converted to a recycle stream composed of at least 98 and preferably 99 weight percent or higher of the original $C_6$ to $C_{30}$ n-paraffin purity while deterring cracking or isomerization of the paraffin and the formation of coke and where the material suitable for recycle to the initial nitration reaction is substantially free of olefins, isomerized n-paraffins, oxygenates and cracked light hydrocarbons. The stream suitable for recycle as provided above is catalytically hydrogenated at a temperature of from about 600° to 750°F., preferably between about 650° and 710°F., for a time of sufficient duration whereby primary amines, secondary amines, alcohols, ketones, aminoalcohols, diamines, triamines contained in the mixture are substantially converted to n-paraffins. The aminated components of the mixture in addition to being converted to n-paraffins act as reaction moderators as described herein.

An additional hydrogenation treatment may in aome instances be desirable as, for example, where the liquid product hydrogenated at about 600° to 750°F. is found to contain small amounts of olefins. Such an additional hydrogenation treatment can be conducted at from about 450° to 650°F. whereby the olefins are converted to n-paraffin.

In general, hydrogenation is undertaken in the presence of hydrogen pressures ranging from about 100 to 1,500 p.s.i.g. for periods of from 0.1 to 5 hours. In continuous processing, the mixture can be introduced at space velocities of from 0.2 to 10 v./v./hr. Highly preferred catalysts employed in the instant process are composed of nickel-molybdenum, cobalt-molybdenum or platinum on an alumina support.

The instant process embodying the improvements related to upgrading recycle stream provides a highly selective process for the production of secondary alkyl primary amines. These amines can be employed as mold-release agents, emulsion freeze-thaw stabilizers, pigment dispersing agents, polyurethan catalysts and anti-caking anti-dusting agents. The amines can also be used as corrosion inhibitors, deleterious bacterial control agents, sludge dispersants and as detergents and deicers in gasolines.

In order to more fully illustrate the nature of this invention and the manner of practicing the same, the following examples are presented. In these examples the best mode contemplated for carrying out the invention is set forth.

EXAMPLE I

A continuous process for converting n-paraffins to secondary alkyl primary amines is undertaken by providing a fresh water-white $C_{10}$ to $C_{14}$ n-paraffin hydrocarbon composition having the following carbon chain length distrubution on a weight percent basis: $C_{10}$ 11.1, $C_{11}$ 28.7, $C_{12}$ 32.2, $C_{13}$ 26.9, $C_{14}$ 1.1. To 10.7 weight percent of fresh normal paraffins there is mixed 89.3 weight per cent of previously processed and upgraded recycle paraffins according to the instant invention.

940 pounds per hour of the paraffin hydrocarbon charge is nitrated with 60 pounds per hour of nitrogen dioxide wherein nitration proceeds at 330°F. under a pressure of 4 p.s.i.g. Off-gases comprising paraffin, nitrogen dioxide, nitric oside, nitrous oxide, nitrogen, carbon dioxide, carbon monoxide and water are withdrawn, the off-gases partially condensed, and condensed paraffin recycled. Nitric oxide in the overhead gas is oxidized to nitrogen dioxide, the oxidized gas cooled to condense nitrogen dioxide, and the liquefied nitrating agent recycled. Non-condensible gases including nitrogen, nitric oxide, nitrous oxide, carbon monoxide and carbon dioxide are vented.

977 pounds of the crude nitrated paraffin product comprising 80 weight percent n-paraffin, 14.7 weight per cent nitroparaffin and 4.4 weight per cent by-products including oxidized paraffin and polyfunctionals of which 0.6 weight per cent are ketones, 1.2 weight per cent are nitrites and 0.5 weight percent are nitrates is continuously caustic washed with about 70 pounds per hour of 10 per cent aqueous sodium hydroxide in a line mixer at 200°F. and 50 p.s.i.g. The resulting aqueous layer is separated in a settler and removed. The organic layer is washed at 180°F. and 50 p.s.i.g. with 27 pounds per hour of water in a conventional countercurrent extraction tower. The washed nitrated product contains 129 pounds of nitrated paraffin and 833 pounds of n-paraffin and other materials that include 0.43 weight per cent ketones, 0.95 weight per cent nitrites and 0.41 weight per cent nitrates.

The crude nitrated paraffin composition is hydrogenated at an average temperature of 400°F. over a hydrogenation catalyst composed of one weight per cent palladium on carbon at a liquid hourly space velocity of 1.5 volumes of liquid per volume of catalyst per hour. Hydrogenation is conducted under a hydrogen pressure of 560 p.s.i.g. Following hydrogenation, essentially all of the nitroparaffin, nitrates and nitrites are reduced. Hydrogen, ammonia and some water are removed as gases and remaining water and ammonia are decanted from the recovered crude hydrogenation product at 110°F.

950 pounds per hour of crude hydrogenation product comprising 844 pounds of n-paraffins and miscellaneous by-products including alcohols and ketones and 25 pounds of secondary alkyl secondary amines, diamines, aminoalcohols and aminoketones, 90 pounds of secondary alkyl primary amine and 16 pounds of water and ammonia is contacted and saturated with 87 pounds per hour of carbon dioxide at 300 p.s.i.g. and 110°F. thereby forming an amine-carbon dioxide complex. The carbon dioxide saturated crude hydrogenation product is countercurrently contacted in a tower with 1,500 pounds per hour of a solvent mixture comprising 40 percent methanol and 60 per cent water, the solvent mixture having been previously saturated with 50 pounds per hour of carbon dioxide at 300 p.s.i.g. and 110°F. Upon contacting of the carbon dioxide saturated crude hydrogenation product with the solvent mixture, the primary amine complex transfers from the predominantly paraffin stream to the solvent stream.

The amine depleted paraffin stream is subsequently reduced to atmospheric pressure in a flash drum whereupon carbon dioxide therein is removed overhead. The amine-enriched solvent stream is heated to a temperature of 150°F. and introduced to a flash tower maintained at atmospheric pressure where carbon dioxide, along with some methanol and water, are removed overhead. The amine-rich liquid from the flash tower is passed through a fractionator where methanol, residual carbon dioxide and some water are removed overhead. The bottom stream containing water and crude amines separates as two phases, namely a water phase containing some methanol and amines, and a crude amine phase containing some water.

100 pounds per hour of the crude amine phase are heated to 248°F. and flashed at 160 mm Hg thereby removing as overhead substantially all of the residual methanol and water, along with some organic materials. After condensation, the organic matter in the overhead is separated from the aqueous layer and combined with the flashed amine phase. The flashed crude amine phase is thereafter vacuum-distilled at 20 mm HG and 200°F. to remove overhead residual methanol, water, paraffinic hydrocarbons and lighter than $C_{10}$ amines. Finally, the amine phase is vacuum distilled at 10 mm Hg and 300°F. to produce 90 pounds per hour of finished amine containing 98.5 weight percent secondary alkyl primary amine. The bottoms from the final distillation are composed of about 10 pounds of a mixture including diamines, aminoalcohols and aminoketones.

830 pounds of the amber colored amine-depleted paraffin stream containing about 15 pounds secondary alkyl secondary amines and about 1 pound of unextracted secondary alkyl primary amines is flashed to remove any residual methanol and carbon dioxide and thereafter combined with the bottoms from the final distillation of the product amines to form a recycle stream comprising about 26 pounds of primary amines, secondary amines and diamines, 14 pounds of oxygenates and about 800 pounds of n-paraffin. The mixed recycle stream is introduced to a hydrogenation reactor at the rate of 840 pounds per hour and hydrogenated at 680°F. with 17 pounds per hour of hydrogen at 500 p.s.i.g. at a liquid hourly space velocity of 1.0 in the presence of a 0.75 platinum on gamma alumina catalyst. After separating hydrogen, ammonia and water, the hydrogenated water-white product is essentially free of amino and oxygenated by-products, isoparaffins and is recycled for introduction to the nitration reactor. The system for producing the amines continues to operate for long periods of time without interruption.

EXAMPLE II

An amine-depleted $C_{10}$ to $C_{14}$ paraffin stream composed of about 5 weight per cent by-products including ketones, alcohols, primary amines, secondary amines, diamines, aminoalcohols and aminoketones similar to Example I is introduced into a hydrogenation reactor containing a 60 per cent nickel on kieselguhr hydrogenation catalyst at the rate of 3.3 pounds per pound of catalyst per hour and hydrogenated at 620°F. with 0.03 pounds per hour of hydrogen at about 600 p.s.i.g. The off-gas contains substantial amounts of methane thereby demonstrating that hydrocracking occurs. The substantial amount of hydrocracking which occurs decreases the yield of primary amine product recoverable per unit of n-paraffin feedstock. The claimed invention illustrated in Example I shows a higher selectivity in converting the mixture to n-paraffin and thereby provides the process with greater yields of recoverable primary amine product per unit of n-paraffin feedstock.

We claim:

1. In a process for producing secondary alkyl primary amines from n-paraffins having from 6 to 30 carbon atoms wherein a portion of said n-paraffin is nitrated to form a nitroparaffin along with nitrated and oxygenated by-products, wherein said nitroparaffin is essentially completely hydrogenated to said amine and where said amine is separated and recovered from a mixture of unreacted paraffin and by-products, the improvement which comprises:
  a. catalytically hydrogenating said mixture of unreacted paraffin and by-products containing from about 10 to 5000 parts per million of nitrogen present as aminated by-products at a temperature of from about 650 to 710°F. under a hydrogen pressure of about 100 to 1500 p.s.i.g. in the presence of a catalyst composed of alumina and a Group VIII metal and
  b. recycling said hydrogenated product of (a) for nitration with said n-paraffin.

2. A process according to claim 1 wherein said hydrogenating in step (a) is conducted at a liquid hourly space velocity of 0.2 to 10.

3. A process according to claim 1 wherein said mixture hydrogenated in (a) is additionally hydrogenated at 450° to 650°F. prior to recycling in (b).

4. A process according to claim 1 wherein said catalyst is platinum on alumina.

5. A process according to claim 1 wherein said catalyst is nickel-molybdenum on alumina.

6. A process according to claim 1 wherein said catalyst is cobalt-molybdenum on alumina.

7. A process according to claim 1 wherein said separated amine is further vacuum distilled to separate an additional by-product stream comprising $C_6$ to $C_{30}$ diamines, aminoalcohols and aminoketones and introducing said by-product stream to the mixture in (a).

8. A process according to claim 1 wherein said hydrogenating in step (a) is conducted in the presence of 100 to 3000 parts per million of nitrogen present as aminated by-products basis said paraffin mixture.

9. A process according to claim 1 wherein said mixture in (a) comprises from about 0.5 to 15 weight per cent oxygenated and aminated by-products.

10. A process according to claim 9 wherein said oxygenated and aminated by-products comprise a $C_6$ to $C_{30}$ alcohol, ketone, aminoketone, aminoalcohol, diamine, triamine and a $C_{12}$ to $C_{60}$ secondary alkyl secondary amine.

* * * * *